United States Patent
Bramhall

[11] 3,906,563
[45] Sept. 23, 1975

[54] POWER WINDSHIELD FOR BOATS
[75] Inventor: Dan E. Bramhall, Neodesha, Kans.
[73] Assignee: Fiberglass Engineering Incorporated, Neodesha, Kans.
[22] Filed: Apr. 25, 1974
[21] Appl. No.: 464,250

[52] U.S. Cl. .......................................... 9/1 R; 9/1 R
[51] Int. Cl.² ............................................ B63B 19/00
[58] Field of Search ............ 9/1 R, 1 T; 49/346, 360

[56] References Cited
UNITED STATES PATENTS

| | | | |
|---|---|---|---|
| 3,121,924 | 2/1964 | Beisel | 9/1 R |
| 3,161,895 | 12/1964 | Lewis | 9/1 R |
| 3,272,021 | 9/1966 | Weber | 49/349 |
| 3,312,017 | 4/1967 | Witherspoon et al. | 49/360 |
| 3,339,665 | 9/1967 | Johnstone et al. | 49/349 |
| 3,775,906 | 12/1973 | Dougherty | 49/360 |

Primary Examiner—Trygve M. Blix
Assistant Examiner—Sherman D. Basinger
Attorney, Agent, or Firm—Lowe, Kokjer, Kircher, Wharton & Bowman

[57] ABSTRACT

A boat having a novel windshield construction is presented by the present invention. First and second opposed windshield sections are mounted on the forward deck at an acute angle to the keel of the boat. The opposing ends of the two sections mount channel-presenting tracks which receive a third windshield section of generally V-shaped configuration. This third section is movable from a raised position beneath the deck. In the raised position the third section cooperates with the first and second windshield sections to present a completed boat windshield of a streamlined V-configuration. When the third windshield section is lowered beneath the deck, an entryway onto the deck from the center of the boat is presented. The third section is moved by an electric motor coupled with it and a drive sprocket powered by the motor. A chain extending from beneath the deck toward the keel presents a gear track along which the sprocket runs. Appropriate stops limit movement of the third section in each of its two directions of movement.

3 Claims, 5 Drawing Figures

US Patent    Sept. 23, 1975    3,906,563
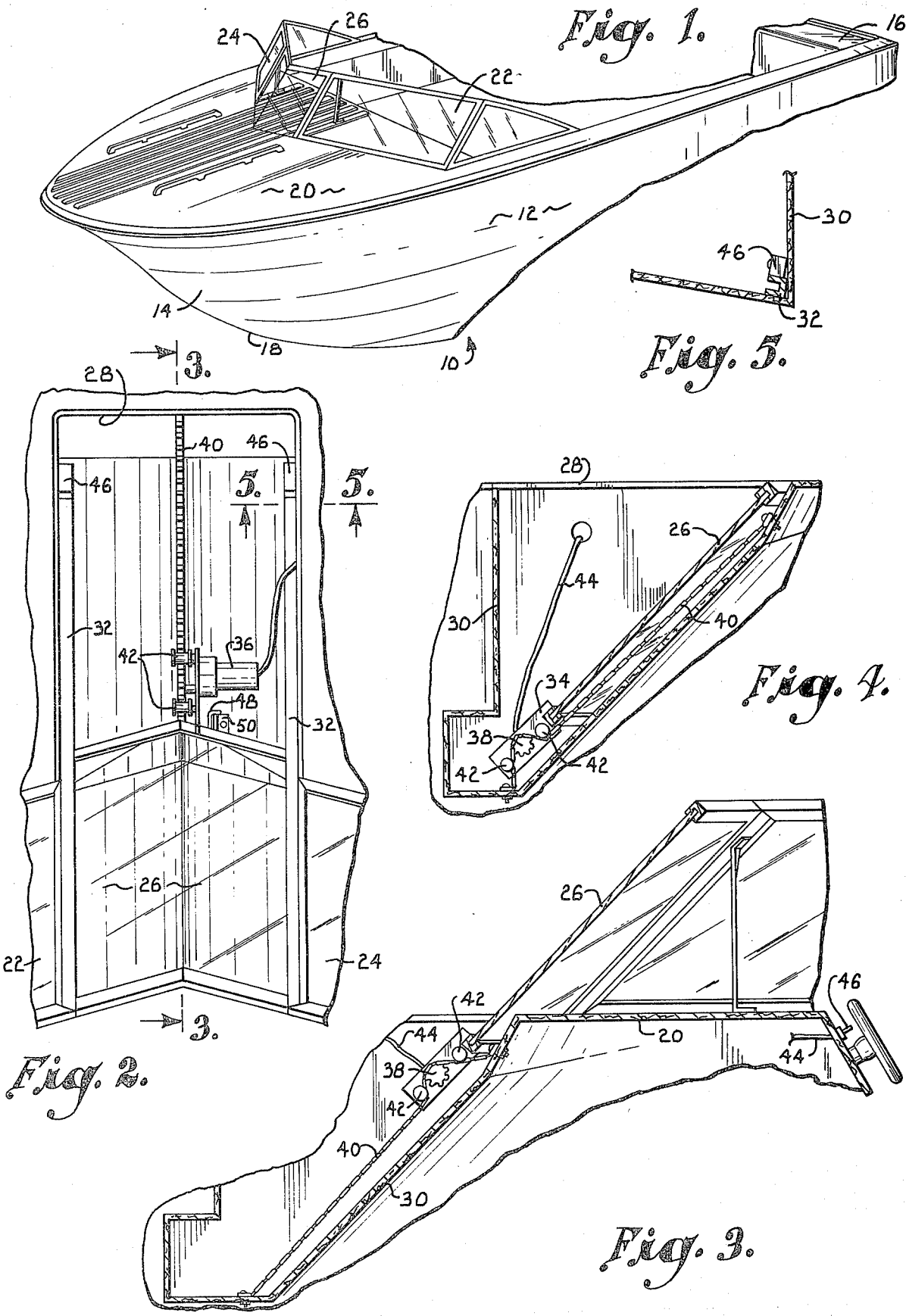

POWER WINDSHIELD FOR BOATS

This invention relates to boat constructions and, more particularly, to a novel windshield for a boat.

It has been known in the art to provide boat windshields which open to permit passage from the main passenger carrying section of the boat onto the forward deck which covers the bow. Such constructions have heretofore been limited to designs which are very limited from an aesthetic standpoint. Particularly, it has been necessary to utilize a flat hinged windshield section for presenting a door that is completely incompatible with the popular deep V hull design.

The presence of the hinged windshield section, once open, is also both unattractive and cumbersome for persons maneuvering in the boat.

It is therefore an object of the present invention to provide a boat windshield wherein a section of the windshield may be opened to present a passageway to the forward deck which section is of generally V-shaped configuration.

As a corollary to the above object, it is an aim of this invention to provide a windshield section which may be opened to present a passage to the forward deck of a boat wherein the section cooperates with other adjacent sections to present a V-shaped boat windshield.

Another important objective of this invention is to provide a boat windshield wherein a section of the windshield is movable to an open position to present a passageway onto the forward deck and which section is of V-shaped configuration and disposed at an acute angle relative to the horizontal to present a streamlined configuration.

Another one of the aims of this invention is to provide a boat windshield as described in the foregoing objects wherein the movable windshield section may be moved to a position beneath the forward deck so as to present a completely open and unobstructed passageway onto the deck.

As a corollary to the above object, one of the objectives of the invention is to provide a boat windshield wherein the movable window section is controlled by an electric motor which moves the windshield section between its raised and lowered positions.

As a corollary to the above objective, an aim of this invention is to provide a novel drive for the movable windshield section which is particularly adapted for boat construction and is economical and efficient.

Other objects of the invention will be made clear or become apparent from the following description and claims when read in light of the accompanying drawing wherein:

FIG. 1 is a fragmentary perspective view of a boat illustrating the windshield construction of the present invention;

FIG. 2 is an enlarged fragmentary plan view of the boat with a section of the deck removed to illustrate the construction of the movable windshield section;

FIG. 3 is a cross-sectional view taken along line 3—3 of FIG. 2 and illustrating the movable section in its raised position;

FIG. 4 is a cross-sectional view, similar to FIG. 3, and illustrating the movable windshield section in its lowered position; and FIG. 5 is a cross-sectional view taken along line 5—5 of FIG. 2.

Referring initially to FIG. 1, a boat is designated generally by the numeral 10 and comprises a generally V-shaped hull 12 presenting a bow 14 and a stern 16. A keel 18 is presented by the hull at the apex of the V configuration.

The bow 14 is covered to present a forward deck 20. Mounted on deck 20 at an acute angle to a vertical plane passing through keel 18 and also at an acute angle to the horizontal are first and second spaced apart windshield sections 22 and 24. Mounted between windshield sections 22 and 24 is a third windshield section 26 which will be described in greater detail hereinafter.

Windshield sections 22 and 24 are disposed on either side of and immediately behind an opening 28 in deck 20 as best illustrated in FIG. 2. Opening 28 provides access to a hold 30 beneath deck 20 as best illustrated in FIGS. 3 and 4.

Third windshield section 26 is a generally V-shaped member which is complemental to the windshield sections 22 and 24 so as to cooperate with the latter to present a completed V-shaped windshield when the third section is in its raised position as shown in FIG. 1. Disposed on opposing side edges of sections 22 and 24 are channel-shaped extrusions 32 (FIG. 5) which present opposed tracks for mounting section 26. The side edges of section 26 are adapted to be received within the channels presented by extrusions 32 for sliding movement.

Secured to the lower end of the V-shaped member which presents third windshield section 26 is a plate 34 which mounts an electric motor 36. Motor 36 is the prime mover for a drive sprocket 38 visible in FIGS. 3 and 4. Extending from a location immediately below deck 28 downwardly in the hold 30 toward keel 18 is an elongated flexible driven member in the form of a length of chain 40 that serves as a gear track for sprocket 38.

Disposed on either side of sprocket 38 are nylon bushings 42 mounted on plate 34 so as to maintain chain 40 taut as it passes around the sprocket. A flexible conduit 44 extending from motor 36 contains power supply and control wires for the motor. A control switch 46 for operating motor 36 is mounted on the dash of the boat as illustrated in FIG. 3.

The lower ends of extrusions 32 are held in place by blocks 46 as best illustrated in FIGS. 2 and 5. An angle bracket 48 is secured to the lowermost end of window section 26 for engagement with a block 50 which serves as a stop to limit upward movement of the window section.

In operation, window section 26 is normally disposed in its raised position illustrated in FIG. 1 to cooperate with sections 22 and 24 to present a completed V-shaped windshield. This is particularly desirable for a boat having a V-shaped hull design such as the boat 10 illustrated in FIG. 1. It is important that the design of window section 26 permits it to present the apex of the V-shaped windshield and also to be disposed at an acute angle relative to the horizontal as are sections 22 and 24. When section 26 is to be lowered to present a passageway onto the forward deck 20 from a location within the boat in the direction of the stern, switch 46 is moved to actuate motor 36 and thus drive sprocket 38. A very important feature of the windshield construction is the utilization of chain 40 for a gear track. The chain provides for an easy means of securing the track to hold 30 with a minimum of bolts extending through the hold. This is desirable in any boat construction to minimize the possibility of water leaking inside of the boat. The chain 40 also permits a degree of flexibility in the gear track so as not to require precise tolerances which would be difficult and expensive to achieve. Finally, chain 40 permits a degree of movement of the gear track to accommodate strains which may be placed on it thus not transferring the strains to the fiberglass hull where they could cause stress cracking.

As sprocket 38 rotates, it will move in a clockwise direction so as to ride down chain 40 toward the lower end of hold 30. This, of course, moves window 26 into the lowered position illustrated in FIG. 4.

With the window 26 completely disposed in hold 30, it is both out of sight and out of the way of any passengers desiring to move onto front deck 20. This is to be contrasted with prior constructions where a swinging door is always present even in the open position.

When window section 26 is again to be raised, this is easily accomplished by moving switch 46 in the opposite direction to reverse motor 36 and turn sprocket 38 in a counter-clockwise direction. In addition to providing the necessary track along which section 26 moves, extrusions 32 also retain section 26 in the proper location between sections 22 and 24.

Utilizing the foregoing windshield construction, a boat windshield is presented which is superior in both aesthetic appearance and operational capabilities over any known windshields heretofore constructed.

Having thus described my invention I claim:

1. A boat comprising:
   a hull having a stern and a bow, the bow having a covered portion defining a deck;
   first and second spaced apart windshield sections mounted on said deck at an acute angle to a vertical plane passing through the keel of the boat;
   a well compartment located beneath the deck immediately in front of said windshield sections,
   there being an opening into said compartment in the deck at the area between said windshield sections;
   first and second track means extending along adjacent edges of said first and second windshield sections respectively, and extending into said well compartment through said opening;
   a third windshield section of generally V-shaped cross section received by said first and second track means and spanning the distance between the latter,
   said third windshield section being movable in a plane intersecting the plane of the deck from a raised position above said deck wherein said first, second and third sections cooperate to present a generally V-shaped boat windshield, along said track means and into said compartment beneath said deck to present an entryway onto the deck from a location aft of said bow; and
   means for moving said third windshield section between said lowered and raised positions and for holding said third section in any location intermediate said lowered and raised positions.

2. A boat as set forth in claim 1, wherein said third windshield section moving means comprises an electrical motor coupled with said third windshield section and having a drive member aligned with the apex of said third window section, and an elongated driven member extending from the bottom of said compartment to said third window section and being aligned with the apex of said third section for engagement with said drive member.

3. A boat as set forth in claim 2, wherein said driven member is flexible thereby avoiding stresses on the compartment wall.

\* \* \* \* \*